United States Patent Office 3,525,950
Patented Aug. 25, 1970

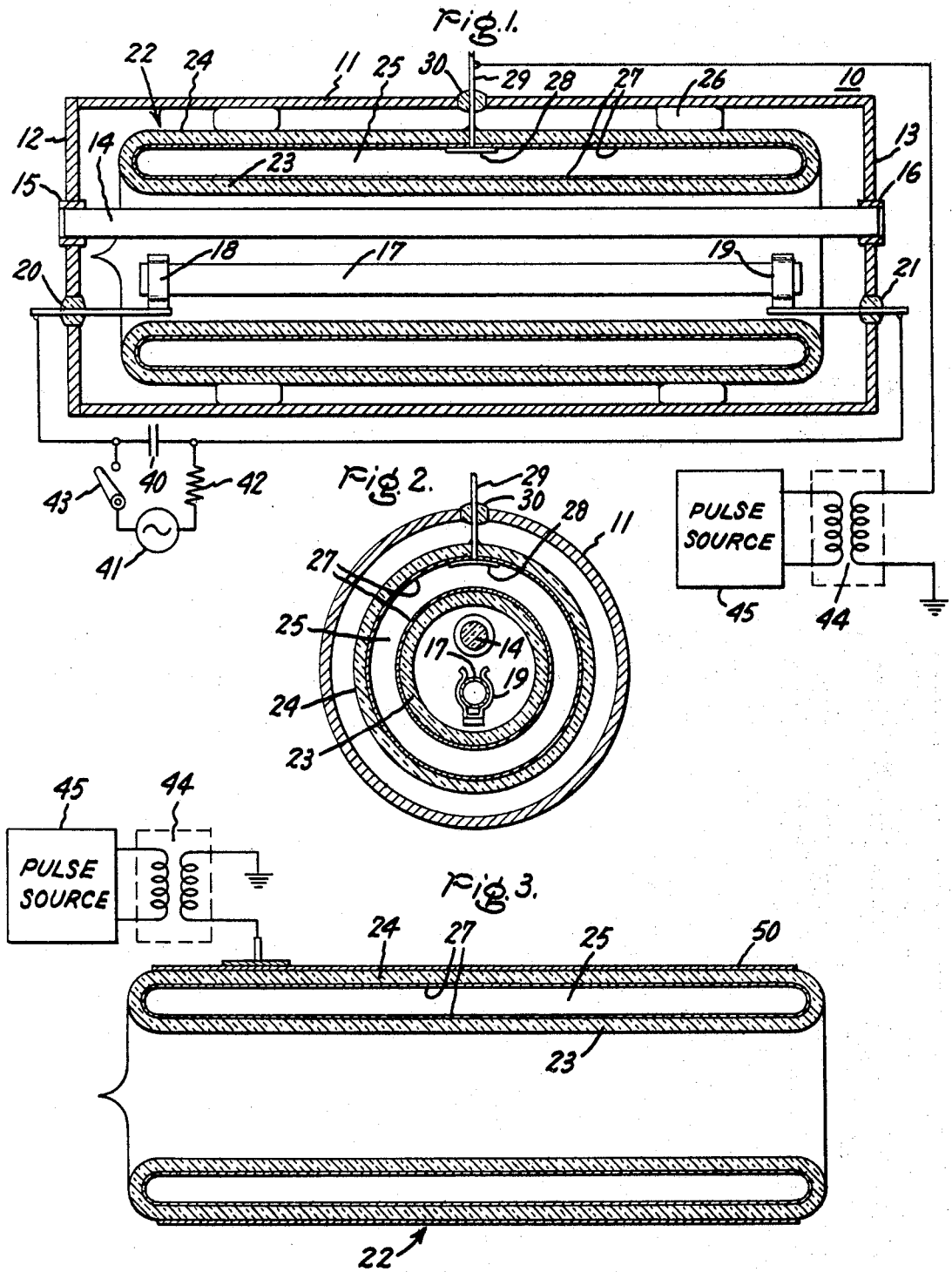

3,525,950
LASER APPARATUS HAVING HIGH EFFICIENCY PUMPING ARRANGEMENT
Joseph P. Chernoch, Scotia, N.Y., assignor to General Electric Company, a corporation of New York
Filed Aug. 7, 1967, Ser. No. 658,882
Int. Cl. H01s 3/09
U.S. Cl. 331—94.5                                    6 Claims

ABSTRACT OF THE DISCLOSURE

Improved pumping of laser rods is achieved in a laser structure utilizing an atmospherically isolated silver reflecting surface which laterally surrounds the laser rod and pumping lamp. Silver is the best obtainable reflector and is prevented from tarnishing by being sealed in a light transmissive envelope which contains no chemically reactive atmosphere. Such a nonreactive atmosphere may be obtained by evacuating the envelope or filling the same with an inert or noble gas.

---

The present invention is directed to improved laser devices and, more particularly, to such devices having a substantially rod shaped coherent optical emitter which is closely juxtaposed to a pumping means and surrounded by a reflector to obtain optimum pumping effectiveness.

Laser devices, now well known to the art, are devices which generate, or amplify, and emit coherent electromagnetic radiation at higher frequencies than microwave frequencies, generally in the infrared and visible portions of the electromagnetic spectrum. For purposes of this description, such wavelengths of radiation will be denominated "optical radiation." The light emission from a laser device is characterized by a narrow wavelength spread, i.e., the light is essentially monochromatic, and exhibits spacial coherence or "in phase" relationship. Because of the coherence of the emission of laser devices, laser beam divergence is generally small and such beams are adapted to transmit high energies for great distances. Laser devices may be fabricated from any active medium in which a population inversion may be established by suitable "pumping." Some such active laser media are neodymium doped glass and ruby, to mention several. One well-known type of laser structure, most generally utilized as an oscillator or generator or coherent electromagnetic radiation, is the "rod type" laser which is generally made of an optically active substance having a solid structure, as for example, ruby. In rod-type lasers, itn is conventional to excite the laser body to a population inversion by juxtaposing closely adjacent thereto a suitable "pumping means" most generally a gas discharge lamp, as for example, a xenon arc lamp which may be parallel, and adjacent to, the laser rod, or which may be in the form of a helix surrounding the rod, or a plurality of circular lamps may surround the rod along its longitudinal dimension.

Coherent emission in laser devices requires "population inversion," a condition which exists when a substantial number of the possible atomic or molecular radiating species in the active laser medium are raised to a metastable energy state above the ground state of the specie. When this condition exists, an incident photon of the laser emission wavelength may stimulate a radiative transition from a metastable level to a lower level, which may or may not be the ground state of the specie. Such radiative transmissions are cumulative and self-sustaining, resulting in the emission of radiation having a high degree of coherence. Population inversion is, for example, achieved by irradiation of a laser medium with a high intensity of electromagnetic radiation of a wavelength of appropriate energy to raise the radiating specie to a metastable state when the radiation is absorbed thereby. Such inversion-causing radiation is referred to as "pumping radiation," and the wavelength of the pumping and activating radiation is known as the "pumping" wavelength. The present invention is directed to rod-type laser apparatus wherein a highly advantageous reflective system is utilized to cause the greatest possible proportion of the pumping radiation emitted by the pumping means to be incident upon the laser body to cause the greatest possible activation and population inversion per unit of energy input to the pumping means.

Accordingly, an object of the present invention is to provide rod laser apparatus wherein the greatest possible proportion of optical pumping radiation is actually utilized to cause activation of the laser body.

Yet another object of the present invention is to provide reflecting means for an optically pumped rod laser device having the greatest possible reflectance.

Still another object is to provide a reflector for an optically pumped rod laser device having a high reflectance which is not diminished over long periods of usage.

Briefly stated, in accord with the present invention, I provide a laser apparatus having a rod of an active laser medium and a closely juxtaposed pumping lamp both of which are laterally surrounded by a reflector having, as the reflective substance thereof, a film of silver deposited upon a suitable substrate. The silver is maintained in a nonreactive atmosphere within an hermetically sealed envelope to prevent tarnishing or other deterioration thereof to provide long-life at high reflectivity.

The novel features believed characteristic of the present invention are set forth in the appended claims. The invention itself, together with further objects and advantages thereof may best be understood with reference to the following description taken in connection with the appended drawings in which:

FIG. 1 illustrates, in vertical cross section, a laser structure constructed in accord with the present invention, FIG. 2 is a cross-sectional view of the laser device of the apparatus of FIG. 1, and FIG. 3 is a vertical cross-sectional view of the reflector utilized in the apparatus of FIGS. 1 and 2.

In FIG. 1, a laser apparatus, represented generally as 10, comprises a cylindrical, metallic container 11 having a pair of apertured end plates 12 and 13. A rod laser body 14 is supported within collets 15 and 16 in end plates 12 and 13 respectively. A gaseous discharge flash lamp 17 is mounted in a pair of spring clips 18 and 19 which are insulatingly supported through bushings 20 and 21 in end plates 12 and 13 respectively. Rod laser body 14 and flash lamp 17 are both enclosed within a hollow cylindrical reflectory member 22 having a double cylindrical side wall including inner wall 23 and outer wall 24 with an annular cylindrical evacuable space 25 therein. Reflecting member 22 is supported within cylindrical member 11 by a plurality of annular grommets 26. The inner surface of annular space 25 is coated with a thin film surface. Electrical contact is made to silver film 27 by means of a metallic probe 28 on the inner surfaces of cylindrical member 22, which is connected by a lead wire 29 which is insulatingly sealed through bushing 30 through exterior cylindrical envelope 11.

In FIG. 2 of the drawing the apparatus of FIG. 1 is illustrated in vertical cross section. As may be seen from FIG. 2 rod laser body 14 and flash lamp 17 are substantially parallel and symmetrically disposed within the inner wall 23 of hermetically sealed reflector-container 22. Both the outer surface of inner wall 23 of envelope 22 and the inner surface of outer wall member 24 of envelope 22 are coated with a reflective film of silver.

Other than the use of silver as the reflective film coating on the inner surfaces of evacuable annular cylindrical envelope 22, a variety of materials may be utilized in construction of apparatus in accord with the present invention. Thus, for example, rod 14 may be any optically active laser material such as ruby or neodymium doped glass which may be stimulated to a population inversion by the application of suitable pumping optical radiation and, thereafter, emit a beam of coherent stimulated radiation. Flashlamp 17 constitutes a pumping means and may be any suitable high energy pulsable light source, as for example, a xenon flashlamp. Although, as illustrated in the drawing, the flashlamp 17 is a cylindrical rod parallel with rod laser body 14, it may conveniently extend a greater length than laser body 14, or be wound in a helix around rod 14 as a longitudinal axis thereof or, in the alternative, a plurality of annular flashlamps encircling rod laser 14 may be utilized.

Evacuable envelope 22 may be any convenient insulating material which is transmissive to optical radiation of a first, or pumping, wavelength and may conveniently be Pyrex or Vycor glass. Other than transparency to the pumping radiation and impermeability to gases which might contaminate the atmosphere contained therein, the only other essential requirement which must be met by this material is that it be of sufficient refractory nature to withstand the heat generated by the operation of the pump and laser.

The silver film 27 on the interior surfaces of evacuable, cylindrical, hollow envelope 22 may be produced either by chemical deposition or by vacuum evaporation, which techniques are well-known to those skilled in the art.

After the forming of film 27, the interior of envelope 22 is evacuated to a reasonable vacuum, such as that which may be conveniently achieved by a mercury or oil diffusion pump, as for example, less than one torr. Alternatively, the interior of the envelope may be filled with an inert gas at a suitable pressure. Utilization of an inert gas, as for example, a noble gas, and particularly a gas having a low molecular weight as for example. Helium is additionally useful, in that a low molecular weight gas contained in the chamber immediately adjacent the heated, active area of the laser apparatus is useful for the transmission of heat from the active area to the exterior of the laser device. Any gas which does not react with silver to cause tarnishing or diminish the reflectivity of the silver film, is suitable. Typically, film 27 may be approximately $10^{-3}$ millimeters thick and may have any greater thickness, as desired.

In operation, stored energy is pulsed through pump lamp 17 to cause population inversion in laser rod 14 and the emission of coherent stimulated emission. The energy to pulse pump lamp 17 is provided by a condenser 40 which is charged by a voltage source 41 through a resistor 42 when switch 43 is closed. Typically, the voltage to which the capacitor 40 is charged may be of the order of 2000 volts and may vary from that voltage depending upon the size and number of pumping lamp 17 utilized and the characteristics thereof. The voltage applied through pulse transformer 44 by pulse voltage down of the vapor within pump lamp 17. Breakdown therein is provided by providing a short pulse of very high voltage across the lamp, which voltage is sufficient to ionize the vapor contained therein. Thus, for example, a pulse of approximately 15 kv., for example, may be applied through pulse transformer 44 by pulse voltage source 45. Typically, the duration of such a pulse may be of the order of 1 microsecond. Upon the application of a high voltage pulse across pump lamp 17, capacitor 40 discharges therethrough and may, for example, consume an energy of the order of several hundred joules. The duration of the pump flash pulse may, for example, be of the order of several hundred microseconds and has been measured to be approximately 300 microseconds. This pumping energy raises radiating sites within the rod laser to an excited state, and a photon of the correct wavelength may cause the emission of stimulated coherent electromagnetic radiation.

As an example to one device constructed in accord with the present invention, a ruby laser rod having a length of 3″ and a diameter of ¼″ was spaced parallel to, and approximately 1/16″ away from, a parallel FX-38 xenon flashlamp, also having a diameter of approximately ¼″. The laser rod and the flashlamp were surrounded by a double walled hollow cylindrical evacuable Pyrex glass envelope having a $10^{-3}$ mm. silver layer formed by chemical deposition on the interior surfaces thereof. The longitudinal length of the reflecting hollow cylinder was approximately 3.75″ and had an inside diameter of .650″ and an outside diameter of 1.0″. The interior of the hermetically sealed evacuable envelope was evacuated to a pressure less than 1 torr and sealed off. A metallic probe passed through one surface wall thereof and contacted the interior reflecting silver coating. When the aforementioned 200 joule, 300 microsecond pulse of pumping radiation was incident upon the laser rod, and a conventional optical shutter or "Q-switch" was used, a highly collimated beam of coherent radiation having a wavelength of 0.69 micron and containing an energy of approximately 0.1 joule and a pulse width of 20 nanoseconds was emitted through the exit face thereof.

FIG. 3 illustrates an alternative embodiment of the invention. In the apparatus of FIG. 3, coupling to the silver film to trigger the flashlamp, rather than by being made directly, as with contact lead 28 through envelope wall 24 as in FIGS. 1 and 2, is accomplished by coupling capacitively with a metal film 50 applied to the outer surface of envelope 22.

Although laser apparatus constructed in accord with the present invention may be utilized either as an oscillator for the generation of coherent stimulated emission, or as an amplifier for the amplification of coherent stimulated emission, in most uses (of the order of 99% of the uses) such devices are utilized as oscillators. When utilized as an oscillator, the end surfaces of the laser rod may be polished to optical smoothness and may be substantially optically parallel. One surface, which is denominated as the exit surface, is then coated with a semireflective coating which is partially reflective to radiation at the output wavelength of the laser, herein denominated as the second optical wavelength. The remaining surface end of the laser rod is then polished and coated with a dielectric layer which imparts thereto substantially 100% reflective characteristics at the laster output wavelength. Alternatively, the surface of the rod may be made non- reflective and separate mirrors and partially reflecting mirrors may be utilized. Similarly a reflecting prism may be utilized as a total reflecting means, as may any functional equivalent.

Apparatus in accord with the present invention makes possible the utilization of silver as a reflector of pumping energy for a rod laser. Silver has a reflectance at the wavelength of the pumping lamp of approximately 96%. This is as compared with a reflectance for aluminum of approximately 86%. Due to the fact that in the cylindrical geometry, utilized in accord with the present invention, multiple reflections from the cylindrical reflecting surface occur by any ray of light before it is incident upon the laser rod, it has been determined that the 10% increase in effectiveness in the intrinsic reflectivity of silver over aluminum, for example, results in approximately a 20% improvement in the amount of incident light which falls upon the laser rod.

Heretofore, it had been impossible to utilize silver as a reflective material in laser apparatus because silver is highly reactive with atmospheric air to produce sulfides and other materials on the surface thereof which result in tarnishing of the silver and vastly reduced reflectivity. Whereas other reflectors, as for example, polished aluminum cylinders or evaporated aluminum surfaces tend to degrade with use, for example, as rapidly as with 200 operations of the laser apparatus, devices constructed in accord with the present invention have been operated as often as 300,000 cycles of operation with no measurable decrease in output due to degradation of failure of the reflecting surface.

What I claim as new and desire to secure by Letters Patent of the United States is:

1. Optically pumped laser apparatus comprising:
   (a) an elongated body of an optically active laser material adapted, when energized with optical radiation at a first preselected wavelength to emit coherent emission at a second preselected optical wavelength,
   (b) pumping means located adjacent said laser body and adapted, when electrically energized, to emit optical radiation at said first wave length,
   (c) reflecting means laterally surrounding said laser body and said pumping means for reflecting optical radiation of said first wavelength from within a cavity defined thereby to said laser body,
      ($c_1$) said reflecting means comprising a substrate and a film of metallic silver thereon and means maintaining a nonreactive atmosphere in contact with said silver,
   (d) electrical energy storage means connected to said pumping means for passing a high energy current pulse through said pump means when said pump means is rendered electrically conductive, and
   (e) pulse means electrically connected to said reflecting means for supplying thereto a short electric field establishing pulse sufficient to render said pump means electrically conductive.

2. The apparatus of claim 1 wherein said reflecting means comprises a double walled concentric hermetically sealed envelope with at least one inside surface thereof coated with a silver film.

3. The apparatus of claim 2 wherein said envelope is evacuated.

4. The apparatus of claim 2 wherein said envelope is filled with a nonreactive gaseous atmosphere.

5. The apparatus of claim 2 wherein electrical contact is made to said silver film by a probe sealed through one wall of said envelope.

6. The apparatus of claim 2 wherein a metallic film coats the outer surface of said envelope and is electrically coupled with said silver film.

References Cited

UNITED STATES PATENTS

| | | | |
|---|---|---|---|
| 3,223,944 | 12/1965 | Luck et al. | 331—94.5 |
| 3,262,004 | 7/1966 | Keller | 331—94.5 X |
| 3,358,243 | 12/1967 | Collins et al. | 331—94.5 |

FOREIGN PATENTS

| | | |
|---|---|---|
| 633,590 | 12/1949 | Great Britain. |
| 782,895 | 9/1957 | Great Britain. |

RONALD L. WIBERT, Primary Examiner

E. BAUER, Assistant Examiner

U.S. Cl. X.R.

350—67